United States Patent [19]

Wolf et al.

[11] Patent Number: 4,700,052

[45] Date of Patent: Oct. 13, 1987

[54] APPARATUS FOR CONTROLLING AND ADJUSTING HEAT OUTPUT DURING THE HEATING PHASE OF A STEAM PRESSURE COOKING VESSEL

[75] Inventors: Kurt Wolf; Wolfram K. Andre, both of Wildbad, Fed. Rep. of Germany

[73] Assignee: Kurt Wolf & Co. KG, Fed. Rep. of Germany

[21] Appl. No.: 829,832

[22] Filed: Feb. 14, 1986

[30] Foreign Application Priority Data

Feb. 15, 1985 [DE] Fed. Rep. of Germany ....... 3505232

[51] Int. Cl.⁴ .............................................. H05B 1/02
[52] U.S. Cl. .................................... 219/497; 219/501; 99/328; 99/331; 426/523
[58] Field of Search ............... 219/490, 491, 505, 494, 219/497, 499, 507, 509; 99/325, 328, 329, 331, 332; 426/520, 523

[56] References Cited

U.S. PATENT DOCUMENTS 3,859,644 1/1975 Main ..................................... 219/499
4,443,690 4/1984 Payne et al. ......................... 219/506

FOREIGN PATENT DOCUMENTS 2932039 2/1981 Fed. Rep. of Germany .
2949890 6/1981 Fed. Rep. of Germany .
3026620 2/1982 Fed. Rep. of Germany .

Primary Examiner—M. H. Paschall
Attorney, Agent, or Firm—Thomas W. Speckman; Ann W. Speckman

[57] ABSTRACT

An apparatus for controlling and adjusting heat output during the heating phase of a steam pressure cooking vessel. The steam pressure cooking vessel is heated by an electric heating element and the temperature inside the steam pressure cooking vessel is measured. The heating element is controlled by a control circuit and a program memory which operates in a simple way at various preset rapid cooking or vitamin preserving cooking temperatures as a function of the heating characteristics and controls the heat output so that the selected cooking temperature can be adjusted and maintained constant in the simplest possible way without overshooting.

18 Claims, 4 Drawing Figures s [%]  Ta = Tk1-Ti OR Tk2-Ti [°C] ⟶

| ΔTy [°C] | 15 | 12 | 9 | 6 | 4,5 | 3 | 2,5 | 2 | 1,5 | 1 | 0,5 | 0 | - |
|---|---|---|---|---|---|---|---|---|---|---|---|---|---|
| <1,5 | 100 | 100 | 50 | 25 | 19 | 19 | 19 | 12,5 | 12,5 | 12,5 | 6 | 0 | 0 |
| 2,0 | 100 | 50 | 25 | 19 | 19 | 12,5 | 12,5 | 6 | 0 | 0 | 0 | | |
| 2,5 | 50 | 25 | 19 | 12,5 | 6 | 0 | 0 | 0 | | | | | |
| 3,0 | 25 | 19 | 6 | 0 | 0 | | | | | | | | |
| 3,5 | 19 | 12,5 | 0 | | | | | | | | | | |
| 4,0 | 12,5 | 6 | | | | | | | | | | | |
| 4,5 | 6 | 0 | | | | | | | | | | | |
| 5,0 | 0 | | | | | | | | | | | | |
| >5,0 | 0 | | | | | | | | | | | | |

FIG. 4

APPARATUS FOR CONTROLLING AND ADJUSTING HEAT OUTPUT DURING THE HEATING PHASE OF A STEAM PRESSURE COOKING VESSEL

BACKGROUND OF THE INVENTION

1. Field of the Invention

The present invention relates to an apparatus for controlling and adjusting heat output during the heating phase of a steam pressure cooking vessel for rapid cooking or vitamin preserving cooking at various temperatures above the evaporation temperature of water, whereby the temperature in and/or at the steam pressure cooking vessel is monitored and employed to adjust the temperature in the steam pressure cooking vessel by means of a control circuit which activates and deactivates an electric heating element as required, to achieve a preset cooking temperature.

2. Description of the Prior Art

An apparatus of this type is disclosed in German Patent Publication DE-OS No. 29 32 039. In this known apparatus, a time function element is automatically adjusted as a function of the temperature or the pressure in the steam pressure cooking vessel in order to influence the cooking or boiling process according to conditions in the steam pressure cooking vessel. The purpose of this arrangement is to insure that the duration of the cooking or boiling process is suitably modified under fluctuating conditions in the steam pressure cooking vessel. An arrangement of this type will only be useful if fluctuating conditions occur during the cooking or boiling process, which might result from unsatisfactory adjustment or control of the cooking or boiling temperature.

In another known apparatus according to German Patent Publication DE-OS No. 30 26 620, the heat output of the heating element is controlled by a microprocessor which is provided with signals from a signal transmitter attached to the steam pressure cooking vessel. The advantage of this arrangement resides in the fact that it allows a number of parameters affecting the cooking or boiling process to be manually preset at the same time. However, this arrangement does not provide any means of automatically adjusting control of the cooking or boiling temperature taking into account different heating characteristics.

SUMMARY OF THE INVENTION

A purpose of the present invention is to provide an apparatus of the above described type in which a steam pressure cooking vessel employed for rapid cooking or vitamin preserving cooking is automatically controlled and adjusted, no matter what the nature or quantity of the cooking materials being processed, so that the selected cooking temperature can be reached and maintained by means of simple switching and control circuits in the most rapid and precise way.

This objective is attained in the apparatus according to the present invention, wherein the heating element is maintained at constant full heat output until a preset trigger temperature is reached which is lower than the evaporation temperature of the water. As soon as the trigger temperature is exceeded, the temperature increase in the steam pressure cooking vessel is measured during preset time intervals, and until a predetermined temperature increase in a preset time interval is reached, the heating element remains switched to full heat output or to a defined heat output. As soon as the predetermined temperature increase during a preset time interval is exceeded, the heating element is deactivated for a first shutdown cycle and is subsequently again activated to full heat output or to a defined heat output until the evaporation temperature is reached. As soon as the evaporation temperature is reached, the heating element is normally deactivated again for a second shutdown cycle and thereafter the temperature increase is monitored, and if a minimum temperature increase is not attained in the following preset time interval, the heating element is again activated to full heat output or to a defined heat output. If a minimum temperature increase is attained, the heating element is activated by the control circuit to full heat output or to a defined heat output in the following time interval according to a preset program, for a time period which is inversely proportional to the amplitude of the measured additional temperature increase in the preceding preset time interval as well as to the temperature differential between the selected cooking temperature and the actual measured temperature in the steam pressure cooking vessel.

During the heating cycle, until the trigger temperature is reached, the heating element is normally operated at its full heat output or at a defined heat output. In the temperature range between the trigger temperature and the evaporation temperature of water, the heating element may be operated at its full heat output or at a defined heat output either continuously or alternately until the evaporation temperature of water is reached, at which point the heating element is deactivated for a first shutdown cycle. Which control mode is employed is determined on the basis of the measured temperature increase, which provides an indication of the nature and quantity of the cooking material being processed. The control mode incorporating a first shutdown cycle is employed whenever the measured temperature increase exceeds a preset level. As soon as the evaporation temperature of water is reached, the heating element is switched off again for a second shutdown cycle to eliminate brief fluctuations of the time/temperature characteristic which always occur specifically within this temperature range. After this second shutdown cycle, the heating output is determined according to a program stored in the memory. During this phase, an additional temperature increase is measured during the predetermined time intervals and compared with a minimum temperature increase.

If the measured additional temperature increase exceeds the minimum preset level, the actuation time of the heating element will be shortened in the subsequent time interval, whereby the activation time is shorter, the higher the measured temperature increase and the smaller the temperature differential between the selected cooking temperature and the actual measured temperature. This program can thus be employed at various levels of cooking temperatures. It is sufficient for the temperature differential between the actual measured temperature and the selected cooking temperature to be measured and transmitted to the program memory. As soon as the evaporation temperature of water is reached, the second shutdown cycle occurs, so that no control or adjustment signals are derived in this very critical phase. After the second shutdown cycle, conditions in the steam pressure cooking vessel will have stabilized and the selected cooking temperature can be achieved using the predetermined program without overshooting.

In another embodiment of the present invention, the control system can be further simplified by providing the control circuitry of the heating element with a semiconductor switch for switching the heating element on and off, which may be controlled in the conventional way by means of a zero crossing switch with period group control functions, whereby the duration of the period corresponds to a preset time interval. The preset time intervals for determination of the temperature increase can then be derived from the timing means in the period group control system.

In a preferred embodiment of the present invention, the duration of the preset shutdown cycles are whole number multiples of the preset time intervals and hence multiples of the duration of the period, thus allowing the duration of these shutdown cycles to be derived from the timing means in the period group control system as well.

In another embodiment of the present invention, the first shutdown cycle is initiated as soon as the trigger temperature is reached by means of continuous comparison of the temperature increase during the heating cycle with a predetermined temperature increase only after the trigger temperature is reached and the heating element is switched off by the control circuit during the first shutdown cycle when the measured temperature increase exceeds the predetermined temperature increase. This result is achieved by derivation of the temperature increase in preset time intervals from the actual measured values of the time/temperature characteristic by means of a first switch circuit, and measured values are transmitted to a first comparator circuit, whereby as soon as the trigger temperature is reached, the measured temperature increase is compared with the predetermined temperature increase in the first comparator circuit. If the measured temperature increase exceeds the predetermined temperature increase, the comparator circuit signals a timing means which is preset for the first shutdown cycle and which disables the control circuit for the length of this cycle, thus preventing activation of the heating element.

The first comparator circuit is controlled in such a way that a first measurement circuit monitors the actual measured temperature value of the time/temperature characteristic to determine whether it has reached the trigger temperature. As soon as this occurs, the first measurement circuit signals the first comparator circuit to compare the measured temperature increase with the predetermined temperature increase. In this way, although the temperature increase is monitored on a continuous basis, it is only compared with the predetermined temperature increase after the trigger temperature has been reached.

In another embodiment of the present invention, initiation of a second shutdown cycle may be effected by a second measurement circuit which monitors whether the measured temperature of the time/temperature characteristic has reached the evaporation temperature. As soon as this occurs, a second measurement circuit signals a timing means which is preset for a second shutdown cycle and this disables the control circuit for the length of the second shutdown cycle, thus preventing activation of the heating element.

In another embodiment of the present invention, a program memory is controlled by a second switch circuit which derives an additional temperature increase from the measured time/temperature characteristic as soon as the evaporation temperature is exceeded and transmits this value to a second comparator circuit, whereby the measured additional temperature increase is compared with a preset minimum temperature increase and if the latter exceeds the former, the control circuit is signaled to activate the heating element to its maximum heat output or to a defined heat output for the following time interval. If the reverse is the case and the measured additional temperature increase exceeds a preset minimum temperature increase, the comparator circuit signals this value to a program memory. The program memory also receives a signal from a third switch circuit which provides the temperature differential between the selected cooking temperature and the actual measured temperature. The program memory derives from the additional temperature increase, the temperature differential, and the stored program, a time signal which determines the percentage of the next time period during which the heating element will remain activated, thus allowing the heating element to be operated either at full heat output or at a correspondingly reduced level.

In another embodiment of the present invention, the heating element is activated for full continuous heat output until the trigger temperature is reached by means of a base measurement circuit which transmits a signal to the control circuit maintaining the heating element at full heat output until the trigger temperature is reached.

In a further embodiment of the present invention the number of electronic components employed may be kept to a minimum by the incorporation of switch circuits, comparator circuits, the base measurement circuit, measurement circuits, timing means, the control circuit and the program memories in a microprocessor.

BRIEF DESCRIPTION OF THE DRAWINGS

The present invention will now be described in greater detail with the aid of embodiments illustrated in the drawings, wherein:

FIG. 4 illustrates a preset program for determining heat output time period as a function of the temperature differential between the selected cooking temperature and the actual measured cooking temperature and as a function of the additional temperature increase $\Delta Ty$ measured during a time interval to.

DESCRIPTION OF PREFERRED EMBODIMENTS

Figure 1:
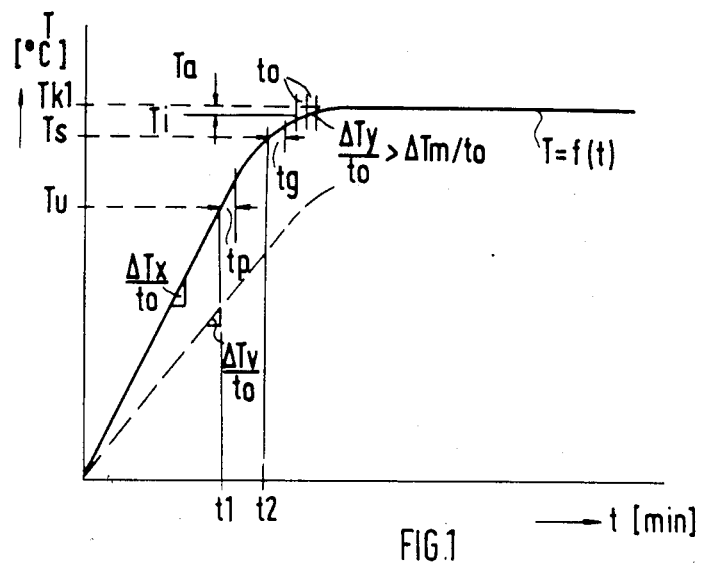
FIG. 1 illustrates a time/temperature characteristic curve showing a large temperature increase in the heating cycle, and utilizing first and second shutdown cycles.

The time/temperature characteristic $T=f(t)$ according to FIG. 1 occurs, for example, when a steam pressure cooking vessel contains only a small quantity of cooking materials. Compared to a mean preset time/temperature characteristic with the preset mean temperature increase $\Delta Tv$ in time interval to, temperature increase $\Delta Tx$ is greater in the same time interval to. The temperature increase $\Delta Tx$ remains roughly constant until just before reaching the evaporation temperature Ts of water which is about 100° C. A trigger temperature Tu is selected which is lower than evaporation temperature Ts of water and may be about 85° C., for example. When temperature increase ΔTx exceeds the preset temperature increase ΔTv, as soon as trigger temperature Tu is reached, the heating element is deactivated for the duration of first shutdown cycle tp. After first shutdown cycle tp, the heating element is again switched to full heat output or to a defined heat output until evaporation temperature Ts is reached.

As soon as evaporation temperature Ts is reached, the heating element is normally switched off for second preset shutdown cycle tg. After second shutdown cycle tg, an additional temperature increase ΔTy during preset time intervals to is measured and compared with a minimum temperature increase ΔTm per time interval to. If the measured additional temperature increase ΔTy is less than minimum temperature increase ΔTm, the heating element is switched to full heat output in the following time interval to. If the measured additional temperature increase ΔTy exceeds minimum temperature increase ΔTm, the heating element is switched by the control circuit to full heat output or to a defined heat output for a heat output time period s in the following time interval to which is determined according to a preset program, taking into account measured additional temperature increase ΔTy and temperature differential Ta between selected cooking temperature Tk1 and the actual measured temperature Ti in the steam pressure cooking vessel. Cooking temperature Tk1 is suitable for rapid cooking, for example, and may be set at 117° C.

After time t1 the heating element is deactivated for the duration of first shutdown cycle tp and after time t2 it is again deactivated for the duration of second shutdown cycle tg.

Figure 2:
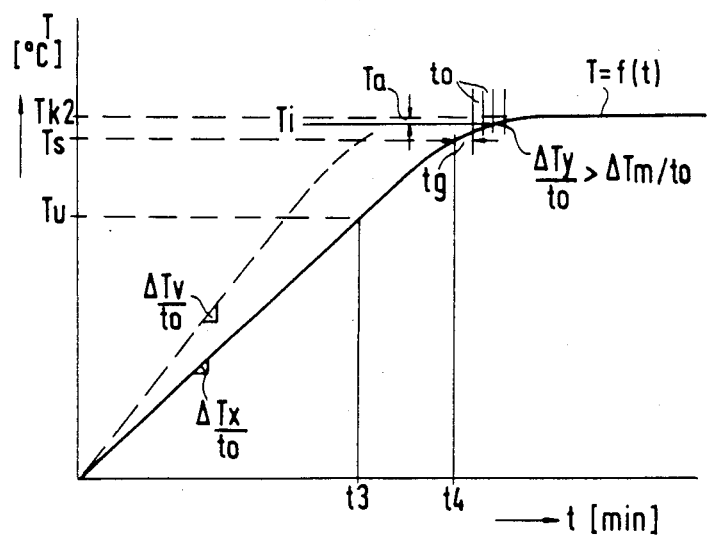
FIG. 2 illustrates a time/temperature characteristic with a smaller temperature increase in the heating cycle utilizing a second shutdown cycle.

With the time/temperature characteristic T=f(t) according to FIG. 2, the steam pressure cooking vessel contains a large quantity of cooking material, so that the temperature increase ΔTx in time interval to will be less than preset temperature increase ΔTv in time interval to according to a mean preset time/temperature characteristic, as shown by the dashed line in FIG. 2.

If the trigger temperature is reached after time t3, the heating element in this case will remain activated at full heat output or at a defined heat output until evaporation temperature Ts is reached at time t4. In this case, the first shutdown phase and the first shutdown cycle tp will not occur. As soon as evaporation temperature Ts is reached, the same switching process and shutdown cycle will occur as with the time/temperature characteristic T=f(t) according to FIG. 1. Since cooking temperature Tk2 is preset for vitamin preserving cooking to about 104° C. in this case, temperature differential Ta will be measured with respect to this preset cooking temperature. The program memory will be controlled in the same way and operation of the heating element will again depend on the measured additional temperature increase ΔTy in time interval to and temperature differential Ta between preset cooking temperature Tk2 and actual measured temperature Ti in the steam pressure cooking vessel.

Figure 3:
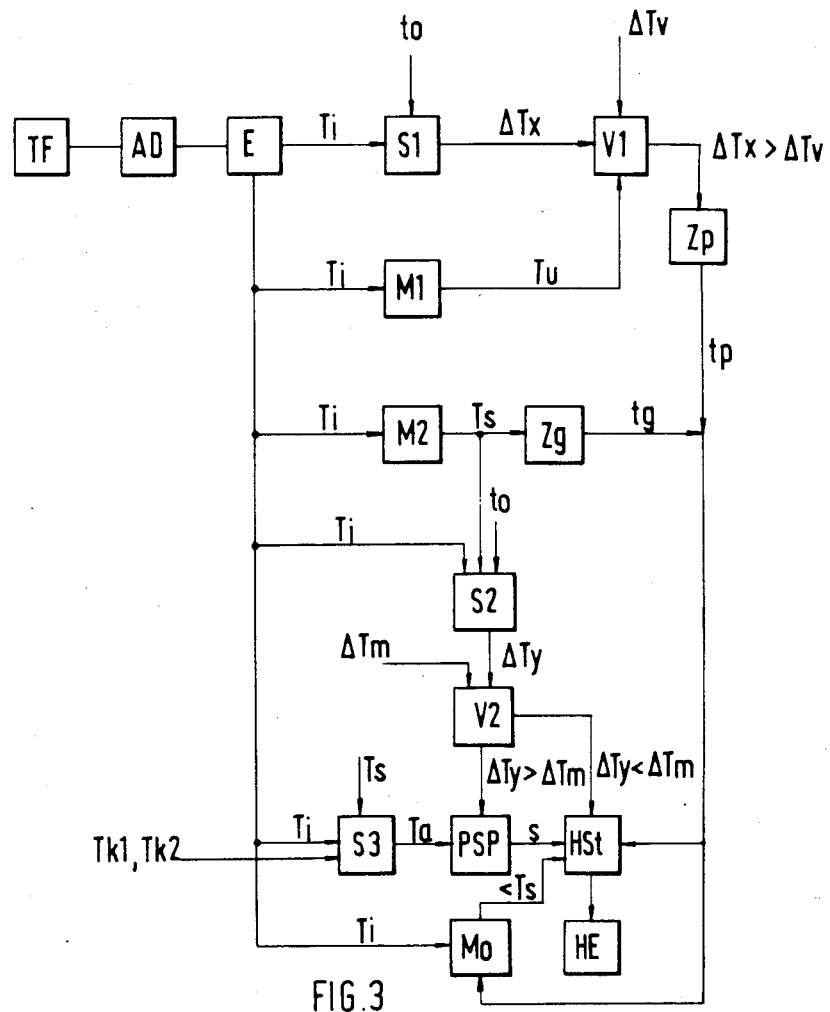
FIG. 3 is a block circuit diagram of an apparatus according to this invention.

The control circuit of heating element HE may be advantageously provided with a period group control circuit, whereby the duration of the period corresponds to time interval to. Shutdown cycles tp and tg may also usefully correspond to whole number multiples of time interval to to enable them to be derived from the timing means of the period group control circuit. The heating processes with time/temperature characteristics T=f(t) according to FIGS. 1 and 2 are described in greater detail with the aid of the block circuit diagram according to FIG. 3.

Temperature Ti in and/or at the steam pressure cooking vessel is measured by temperature sensor TF. The measured temperature may be converted by a/d converter AD, for example, to a digital signal which is transmitted to receiver E over transmission link Ue. Temperature measurement signal Ti is then monitored by first measurement circuit M1 until it reaches trigger temperature Tu and by second measuremet circuit M2 until it reaches evaporation temperature Ts. At the same time temperature measurement Ti is transmitted to first switch circuit S1 which measures the temperature increases ΔTx in time intervals to and transmits these to first comparator circuit V1. Predetermined temperature increase ΔTv is continuously transmitted to first comparator circuit V1. As soon as trigger temperature Tu is reached, a signal is transmitted to first comparator circuit V1 by first measurement circuit M1 for purposes of comparison. If temperature increase ΔTx measured in time interval to exceeds predetermined temperature increase ΔTv for this time interval, first comparator circuit V1 will provide a signal to timing means Zp which will disable control circuit HSt and thus deactivate heating element HE during first shutdown cycle tp.

Timing means Zp also disables base measurement circuit Mo which provides a signal to control circuit HSt until evaporation temperature Ts is reached, so that heating element HE is switched to full heat output. After first shutdown cycle tp, base measurement circuit Mo is enabled until evaporation temperature Ts is reached. If the measured temperature increase ΔTx is less than predetermined temperature increase ΔTv, no signal is supplied to timing means Zp by first comparator circuit V1 and base measurement circuit Mo is not disabled until evaporation temperature Ts is reached. As a result, heating element HE remains activated at its full heat output or to a defined heat output until evaporation temperature Ts is reached.

As soon as evaporation temperature Ts is reached, second measurement circuit M2 is actuated and provides a signal to second timing means Zg. Second timing means Zg deactivates heating element HE through control circuit HSt for the duration of second shutdown cycle tg. Second switch circuit S2 derives additional temperature increase ΔTy during preset time intervals to from actual measured temperature Ti and transmits it to second comparator circuit V2 which compares additional temperature increase ΔTy with a minimum temperature increase ΔTm per time interval to. If the latter (ΔTm) exceeds the former (ΔTy), second comparator circuit V2 operates control circuit HSt throughout the following time interval to so that heating element HE remains activated at its full heat output or at a defined heat output. However, if the reverse is the case and the measured additional temperature increase ΔTy exceeds or is equal to the preset minimum temperature increase ΔTm, program memory PSP and control circuit HSt are enabled.

Additional temperature increase ΔTy and temperature differential Ta are transmitted to program memory PSP. Temperature differential Ta is derived from the difference between preset cooking temperature Tk1 or Tk2 and the actual temperature measurement Ti in the steam pressure cooking vessel by third switch circuit S3. The table according to FIG. 4 shows the program stored in program memory PSP. The horizontal rows contain temperature differential values Ta=Tk1−Ti or Tk2−Ti of from 0° to 15° C. The vertical columns show values of measured additional temperature increases ΔTy from 0° to >5° C. The tabulated values show heat output time period s as a percentage of time interval to during which heating element HE remains activated. If the temperature differential were 6° C., for example, and the additional temperature increase ΔTy measured in the time interval to were 2.5° C., this would give a value for s of 12.5 percent, i.e., in the following time interval to, which might be 24 seconds, for example, heating element HE would be activated for only a period of 0.125×24 seconds=3 seconds.

For each subsequent time interval to, the additional temperature increase ΔTy is measured and temperature differential Ta is calculated, whereby heating element HE is activated in each subsequent time interval to either continuously or for a limited period according to the control program.

We claim:

1. An apparatus having a control circuit means for controlling and adjusting heat output of a heating element during the heating phase of a cooking vessel prior to reaching a preset cooking temperature greater than the evaporation temperature of water, said apparatus comprising:

temperature sensor means (TF) for continuously measuring an actual temperature (Ti) at said cooking vessel;

first switch circuit means (S1) in communication with said temperature sensor means (TF) for measuring a first temperature increase (ΔTx) during consecutive preset time intervals (to);

first measurement circuit means (M1) in communication with said temperature sensor means (TF) for monitoring said actual temperature measurements (Ti) and signalling a first comparison circuit means (V1) when a first trigger temperature (Tu) less than the evaporation temperature of water has been reached;

first comparison circuit means (V1) in communication with said first switch circuit means (S1) and said first measurement circuit means (M1) for comparing each said first temperature increase (ΔTx) to a first preset minimum temperature increase (ΔTv);

first timer means (Zp) in communication with said first comparison circuit means (V1) and said control circuit means (HSt) for deactivating said control circuit means (HSt) for a first shutdown cycle (tp) after said first trigger temperature (Tu) has been reached; and when said first temperature increase (ΔTx) exceeds said first preset minimum temperature increase (ΔTv);

second measurement circuit means (M2) in communication with said temperature sensor means (TF) for monitoring said actual temperature measurements (Ti) and activating a second timer means (Zg) when a second trigger temperature (Ts) corresponding approximately to the evaporation temperature of water has been reached;

second timer means (Zg) in communication with said second measurement circuit means (M2) and said control circuit means (HSt) for deactivating said control circuit means (HSt) for a second shutdown cycle (tg) after said second trigger temperature has been reached;

second switch circuit means (S2) in communication with said temperature sensor means (TF) and said second measurement circuit means (M2) for measuring a second temperature increase (ΔTy) during consecutive preset time intervals (to) after said second trigger temperature (Ts) has been reached;

second comparison circuit means (V2) in communication with said second switch circuit means (S2) for receiving said second temperature increase measurements (ΔTy) and comparing each said second temperature increase (ΔTy) to a second preset minimum temperature increase (ΔTm); signalling said control circuit (HSt) when said second temperature increase (ΔTy) is less than said second preset minimum temperature increase (ΔTm); and signalling a program memory means (PSP) when said second temperature increase (ΔTy) is equal to and greater than said second preset minimum temperature increase (ΔTm);

third switch circuit means (S3) in communication with said temperature sensor means (TF) for measuring a temperature differential (Ta) between said preset cooking temperature and said actual temperature measurement (Ti) during consecutive said preset time intervals (to) after said second trigger temperature has been reached;

program memory means (PSP) in communication with said second comparison circuit means (V2) and said third switch circuit means (S3) for deriving a heat output time period (s) when said second temperature increase measurement (ΔTy) exceeds said second preset minimum temperature increase (ΔTm), said heat output time period (s) being inversely proportional to said second temperature increase measurement (ΔTy) and proportional to said temperature differential (Ta);

said control circuit means (HSt) in communication with said program memory means (PSP), said first and second timer means (Zp), (Zg), respectively, said second comparison circuit means (V2), and said heating element, for maintaining said heating element at a first output until said first trigger temperature (Tu) is reached; deactivating said heating element for a first shutdown cycle after said first trigger temperature (Tu) is reached; maintaining said heating element at a second output after said first shutdown cycle and until said second trigger temperature is reached; deactivating said heating element for a second shutdown cycle after said second trigger temperature (Ts) is reached; regulating said heating element according to said program memory means (PSP) in response to said heat output time period (s); and maintaining said heating element at a third output after said second shutdown cycle until said preset cooking temperature is reached.

2. An apparatus according to claim 1, wherein said control circuit means (HSt) comprises a semiconductor switch which activates and deactivates said heating element and a zero crossing switch with a period group control circuit, whereby the duration of each period of said period group control circuit corresponds to said preset time interval (to).

3. An apparatus according to claim 1, wherein said first switch circuit (S1) continuously derives said first temperature increase (ΔTx) during consecutive said preset time intervals (to) and continuously transmits this first temperature increase (ΔTx) value to said first comparison circuit means (V1).

4. An apparatus according to claim 3, wherein said first measurement circuit means (M1) activates said first comparison circuit means (V1) to compare said first temperature increase (ΔTx) with said first preset temperature increase (ΔTv) after said first trigger temperature (Tu) has been reached.

5. An apparatus according to claim 1, additionally comprising a base measurement circuit means Mo in communication with said temperature sensor and said control circuit means for maintaining said heating element (HE) at a first heat output until said first trigger temperature (Tu) is reached.

6. An apparatus according to claim 5, wherein said switch circuit means (S1, S2, S3), said comparison circuit means (V1, V2), said base measurement circuit means (Mo), said measurement circuit means (M1, M2), said timer means (Zp, Zg), said control circuit means (HSt) and said program memory means (PSP) are all incorporated in a microprocessor.

7. An apparatus according to claim 1 wherein said switch circuit means (S1, S2, S3), said measurement circuit means (M1, M2), said comparison circuit means (V1, V2), said timer means (Zp, Zg), said program memory means (PSP), and said control circuit means (HSt) are incorporated in a microprocessor.

8. A process for controlling and adjusting heat output of a heating element during the heating phase of a cooking vessel prior to reaching a preset cooking temperature greater than the evaporation temperature of water, said process comprising:

continuously measuring an actual temperature (Ti) at said cooking vessel;

maintaining said heating element at a first heat output until a first trigger temperature Tu) less than the evaportion temperature of water is reached;

measuring a first temperature increase (ΔTx) during consecutive preset time intervals (to) and comparing said first temperature increase measurements (ΔTx) to a first preset minimum temperature increase (ΔTv) established for said preset time intervals (to);

inactivating said heating element for a first shutdown cycle (tp) after said first trigger temperature (Tu) has been reached and after a preset time interval (to) wherein said first temperature increase measurement (ΔTx) exceeded said first preset minimum temperature increase (ΔTv);

maintaining said heating element at a second heat output until a second trigger temperature (Ts) corresponding approximately to the evaporation temperature of water has been reached;

inactivating said heating element for a second shutdown cycle (tg) after said second trigger temperature (Ts) has been reached;

measuring a second temperature increase (ΔTy) during each consecutive said preset time interval (to) after said second trigger temperauture (Ts) has been reached, and comparing each said second temperature increase (ΔTy) to a second preset minimum temperature increase (ΔTm) established for said preset time intervals (to);

maintaining said heating element at a third heat output during each said preset time interval (to) when said second temperature increase (ΔTy) is less than said second preset minimum temperature increase (ΔTm) during the preceding said preset time interval (to);

measuring a temperature differential (Ta) between said measured actual temperature (Ti) and the preset cooking temperature when said second temperature increase (ΔTy) is equal to and greater than said second preset minimum temperature increase (ΔTm) during the preceding said preset time interval (to);

regulating said heating element according to a preset program and in response to said second temperature increase (ΔTy) and said temperature differential (Ta) measured during the preceding said time interval (to) when said second temperature increase (ΔTy) is equal to and greater than said second preset minimum temperature increase (ΔTm) during the preceding said preset time interval (to) until the preset cooking temperature is attained.

9. A process according to claim 8, wherein the duration of said first and second shutdown cycles (tp and tg) is a whole number multiple of said preset time interval (to).

10. A process according to claim 9, wherein said first temperature increase (ΔTx) is continously measured during said heating phase and is compared with said first preset minimum temperature increase (ΔTv) only after said first trigger temperature (Tu) is reached; and said heating element (HE) is deactivated by said control circuit (HSt) for said first shutdown period (tp) as soon as said comparison indicates said first temperature increase (ΔTx) exceeds said first preset minimum temperature increase (ΔTv).

11. A process according to claim 8 wherein the preset cooking temperature corresponds to a rapid cooking temperature, and is about 117° C.

12. A process according to claim 8 wherein the preset cooking temperature corresponds to a vitamin preserving cooking temperature, and is about 104° C.

13. A process according to claim 8 wherein said first trigger temperature (Tu) is about 85° C. and said second trigger temperature (Ts) is about 100° C.

14. A process according to claim 8 wherein said heating element is regulated according to said preset program to provide that heat output in subsequent said preset time intervals (to) is inversely proportional to said second temperature increase (ΔTy) and proportional to said temperature differential (Ta) measured during the preceding said preset time interval (to).

15. A process according to claim 14 wherein said first heat output, said second heat output, and said third heat output all correspond to full heat output of said heating element.

16. A process according to claim 14 wherein said first heat output, said second heat output, and said third heat output all correspond to a specified percentage of full heat output less than the full heat output of said heating element.

17. A process according to claim 8 wherein said first heat output, said second heat output, and said third heat output all correspond to full heat output of said heating element.

18. A process according to claim 8 wherein said first heat output, said second heat output, and said third heat output all correspond to a specified percentage of full heat output less than the full heat output of said heating element.

* * * * *